US007126929B2

(12) United States Patent
Turney et al.

(10) Patent No.: US 7,126,929 B2
(45) Date of Patent: Oct. 24, 2006

(54) ANTENNA METHOD AND APPARATUS

(75) Inventors: William J. Turney, Schaumburg, IL (US); Steven C. Jasper, Hoffman Estates, IL (US)

(73) Assignee: Motorola, Inc., Schaumburg, IL (US)

( * ) Notice: Subject to any disclaimer, the term of this patent is extended or adjusted under 35 U.S.C. 154(b) by 844 days.

(21) Appl. No.: 10/329,746

(22) Filed: Dec. 26, 2002

(65) Prior Publication Data

US 2004/0136341 A1 Jul. 15, 2004

(51) Int. Cl.
*H04B 1/38* (2006.01)
*H04M 1/00* (2006.01)

(52) U.S. Cl. .................. 370/334; 370/276; 455/562.1; 455/132; 455/272

(58) Field of Classification Search ................ 370/201, 370/276, 277, 282, 278, 334; 455/561, 562.1, 455/132, 272, 137, 101, 133, 134, 135, 273, 455/277.1, 277.2

See application file for complete search history.

(56) References Cited

U.S. PATENT DOCUMENTS 5,203,018 A * 4/1993 Hirose .......................... 455/61
5,355,520 A * 10/1994 Freeburg et al. ............ 455/507
5,532,708 A 7/1996 Krenz et al.
5,963,874 A 10/1999 Mahler
6,580,701 B1 6/2003 Ylitalo et al.
2003/0072396 A1 4/2003 Binshtok et al.
2003/0078012 A1 4/2003 Ito et al.
2004/0087281 A1 5/2004 Ylitalo

* cited by examiner

*Primary Examiner*—Ajit Patel
(74) *Attorney, Agent, or Firm*—Fitch, Even, Tabin & Flannery

(57) ABSTRACT

A wireless communication unit provides (10) a first signal as received from a first portion (11) of a single antenna and provides (13) a second signal as received from a second portion of the antenna, which in a preferred embodiment can comprise a feedline (12). The two signals contain information that is cross-coupled with respect to one another as a function, at least in part, of the structure of the antenna. A digital processing platform (34) de-couples (17) these signals to permit recovery of the original payloads. In one embodiment similar approaches are used to facilitate cross-coupling of signals and transmission of such cross-coupled signals from different portions of a single antenna structure. In another embodiment, both transmission and reception are facilitated by a common platform.

23 Claims, 3 Drawing Sheets

ANTENNA METHOD AND APPARATUS

TECHNICAL FIELD

This invention relates generally to wireless communications and more particularly to antennas and antenna interfaces.

BACKGROUND

Many wireless devices radiate radio frequency energy (and/or receive radiated radio frequency energy) that carries an informational payload. In many cases, a given antenna will be carefully selected and matched to work effectively with a given transmitter/receiver. In general, such an approach provides satisfactory results in a number of varied applications.

Some wireless communications techniques are better facilitated with multiple antennas. Some known architectures provide for a dual mode antenna wherein only one of the two modes can be utilized at any given time. Other multiple antenna applications exist as well. For example, many diversity approaches use two or more antennas. As another example, applications such as Multiple Input Multiple Output (MIMO) and Bell Labs Layered Space Time (BLAST) are typically effected with at least two antennas per transmitter/receiver.

While such applications provide numerous benefits, the attendant need for multiple antennas sometimes militates against use of such techniques in certain situations. For example, applications that are particularly sensitive to cost limitations and/or space/form-factor limitations are not ideal candidates for a multiple antenna architecture. Hand-held subscriber units, for example, tend to be relatively small with cost limitations often strongly influencing configuration choices.

BRIEF DESCRIPTION OF THE DRAWINGS

The above needs are at least partially met through provision of the antenna method and apparatus described in the following detailed description, particularly when studied in conjunction with the drawings, wherein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION

Generally speaking, pursuant to many of these various embodiments, a first payload signal that corresponds to energy received at a first part of an antenna and a second payload signal that corresponds to energy received at a second part of the antenna and that is at least partially cross-coupled with the first payload signal as a function of the structure of the antenna are provided to a digital processing platform where they are substantially decoupled from one another. So configured, a single antenna structure (including, for example, a feedline) can, in effect, serve as multiple antennas for a variety of applications. With this significant reduction in antennas, cost-sensitive and form-factor sensitive platforms that once might have been considered unlikely applications for widespread use with certain wireless communications techniques are now more readily available.

In one embodiment, the antenna is comprised of an "antenna" (or antenna structure) that serves as one of the antenna parts and a feedline that serves as another of the antenna parts, wherein both such antenna parts radiate/receive radiation as described. In a preferred embodiment, the antenna can be comprised of a dipole antenna having a corresponding balanced feedline.

In another embodiment, a digital processing platform cross-couples two payload signals and provides the two resultant signals to be separately radiated by the different antenna parts. For example, in one embodiment, one resultant signal is radiated by an antenna portion and the remaining resultant signal is radiated by the feedline to the antenna portion. In one embodiment suitable for use with frequency division duplex, duplexers are used to permit both reception and transmission of cross-coupled signals. These same techniques are also useful with time division duplex.

In one embodiment, a cross-coupled sum and difference engine serves to facilitate cross-coupling and/or de-coupling.

Figure 1:
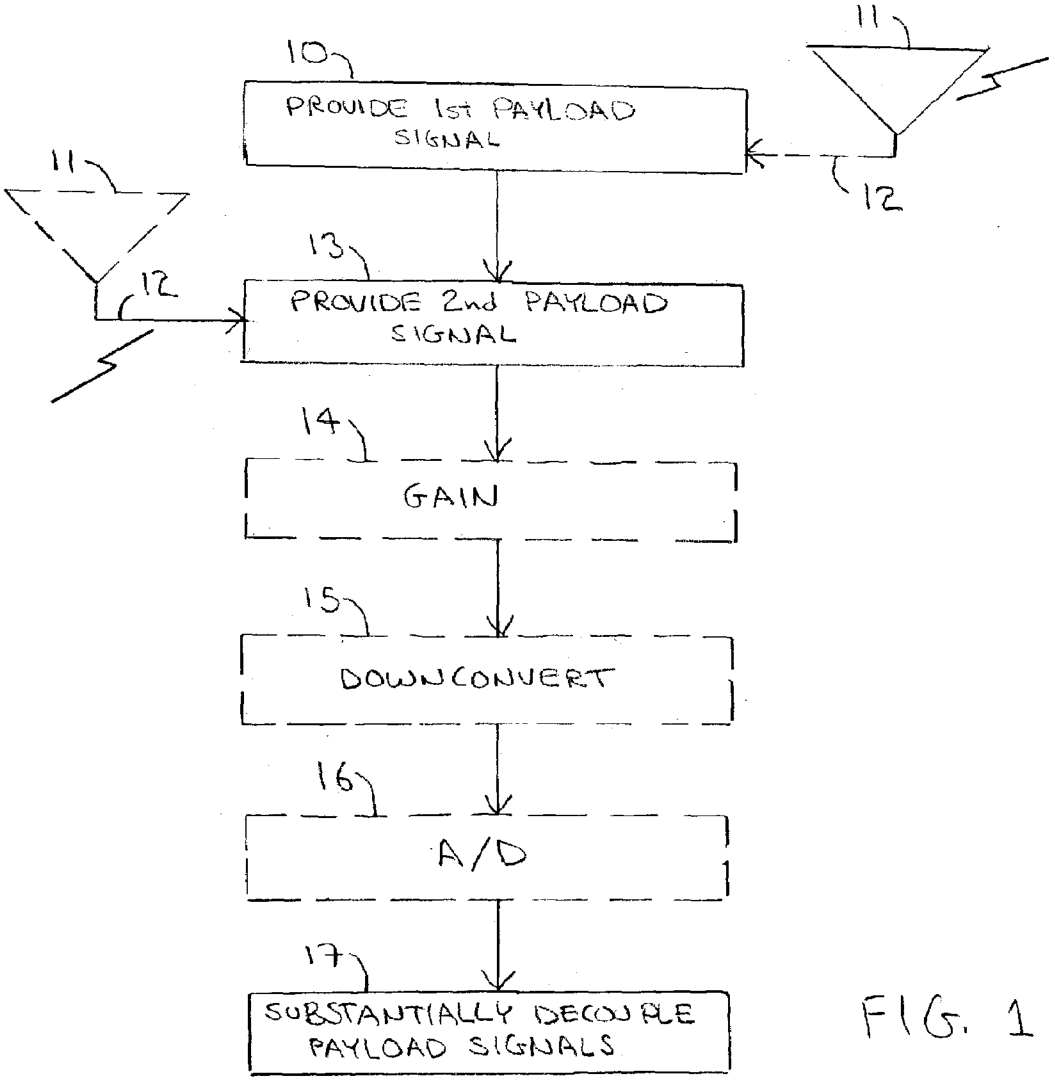
FIG. 1 comprises a flow diagram for reception as configured in accordance with an embodiment of the invention.

Referring now to FIG. 1, a process embodiment to achieve such reception will be described. As referenced above, a single antenna structure comprised of an antenna portion 11 and feedline 12 serve to receive a first and second payload signal, which signals are at least partially cross-coupled. At a minimum, these signals are cross-coupled as a function of the structure of the antenna. If desired (or as may otherwise occur), the signals can also be further cross-coupled at the transmitter and/or in the propagation medium as well understood in the art. The first payload signal is provided 10 by the antenna portion 11 and the second payload signal is provided 13 by the feedline 12. (This example serves only to illustrate these concepts and should not be viewed as limiting. For example, the first payload signal could be provided by the feedline 12 and the second payload signal could be provided by the antenna portion 11.)

Depending upon the needs of a given application, some preprocessing may be appropriate or desired. For example, gain 14 may be applied, the received carrier that carries these payloads may be downconverted 15 (downconverting being typically understood as the mixing or combination of energy as received by the antenna portion/feedline with another signal, such as the output of, for example, one or more local oscillators to provide a resultant intermediate carrier (up to and including a baseband representation of the payload information) that typically features a lower frequency than the original received carrier), and/or the payload signals may be converted 16 to digital form. Such options and techniques are well known and understood in the art, and hence further elaboration will not be provided here for the sake of brevity and the preservation of focus.

The process then substantially decouples 17 the digital representations of the first and second payload signals. As will be depicted below with more specificity, in a preferred embodiment such decoupling occurs in a digital processing platform such as a digital signal processor or other properly programmed platform (such as a microprocessor or programmable gate array) or other hard configured dedicated circuit.

Figure 2:
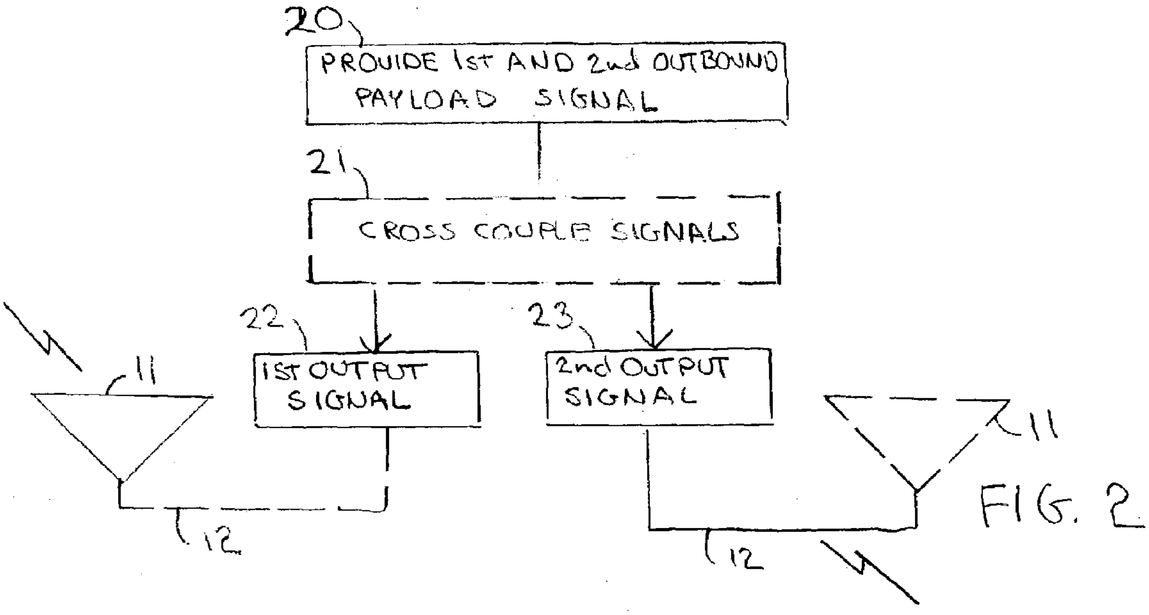
FIG. 2 comprises a flow diagram for transmission as configured in accordance with an embodiment of the invention.

Referring now to FIG. 2, a transmission process works effectively in reverse. Upon provision 20 of a first and second outbound payload signal, the outbound payload signals are optionally suitably cross-coupled 21 to yield a resultant first and second output signal 22 and 23 for transmission via the antenna portion 11 and the feedline 12, respectively (as per this illustration). In a preferred embodiment, and pursuant to the cross-coupling 21, one of the output signals, such as the first output signal 22, corresponds to a sum of the first and second payload signal. The remaining output signal (such as the second output signal 23 in this illustration) corresponds to a difference between the first and second payload signal. So configured, the sum result will be transmitted by the antenna portion 11 and the difference result will be transmitted by the feedline portion 12 of the antenna. In an alternative embodiment, the two original signals are not informationally cross-coupled such that the first output signal 22 can comprise the first outbound payload signal and the second output signal 23 can comprise the second outbound payload signal. For example, one output signal can be horizontally polarized and the second signal can be vertically polarized and otherwise independent of one another.

Depending upon the needs of the application the received and or transmitted energy can comprise a part of a frequency division duplex communication system, a time division duplex communication system, or such other resource allocation and/or modulation scheme as may be desired.

Figure 6:
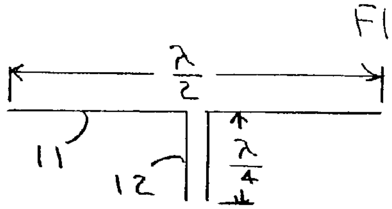
FIG. 6 comprises a schematic diagram of an antenna structure as configured in accordance with various embodiments of the invention.

Referring now to FIG. 6, in this embodiment, the antenna portion 11 comprises a dipole antenna having a one-half wavelength size with respect to the desired carrier frequency. The feedline 12 portion of the antenna is approximately one-quarter wavelength with respect to the desired carrier frequency. So configured, a differential feed as applied to the feedline 12 will result in radiation of energy from the antenna portion 11 but little or none from the feedline 12 itself Conversely, by providing common gain mode excitation to the feedline 12, energy will tend to radiate from the feedline 12 and not from the dipole antenna 11 itself Therefore, by supplying a first signal to the inputs of the antenna structure as a differential feed and a second signal to the inputs as a common gain mode excitation, the first signal will tend to radiate from the dipole portion 11 and the second portion will tend to radiate from the feedline 12.

Figure 3:
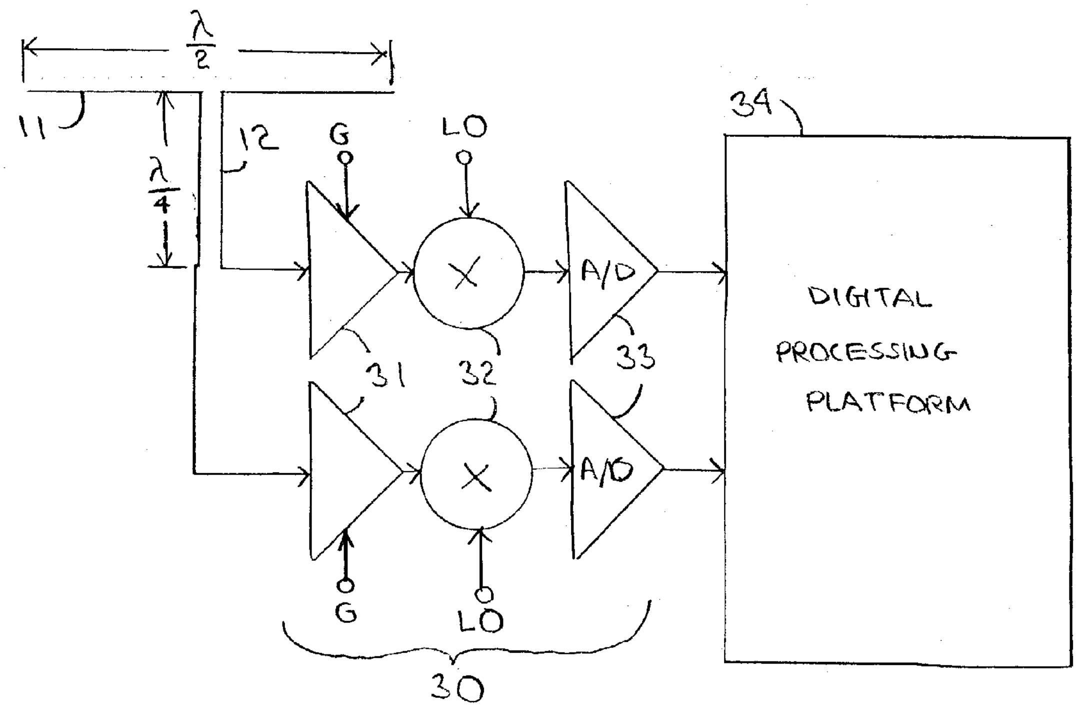
FIG. 3 comprises a block diagram for a receiver as configured in accordance with an embodiment of the invention.

Referring now to FIG. 3, in one embodiment for a receiver, each output of the antenna 11/12 feeds a series of pre-processing stages 30. In particular, a gain stage 31 provides gain G suitable to increase the received signal to a useful level for easing subsequent processing. A down converting stage 32 mixes the amplified received signal with the output of a local oscillator LO (wherein both down converting stages 32 may be serviced by independent local oscillators or by a shared local oscillator as desired) to yield a down converted signal. An analog-to-digital conversion stage 33 then serves to convert the down converted signal into a digital representation thereof (the resolution of the conversion process can be selected to suit the accuracy needs of a given application).

Figure 4:
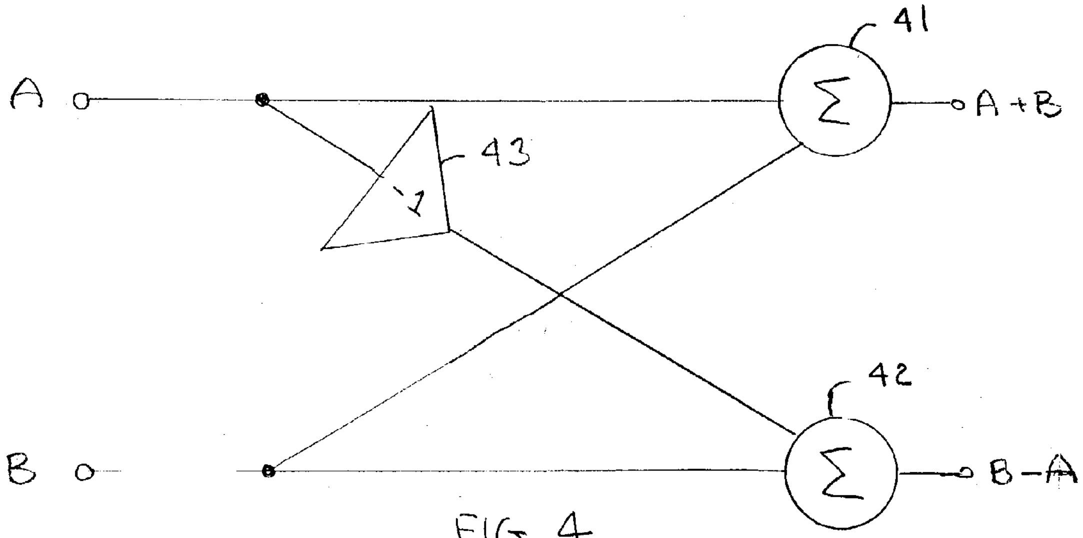
FIG. 4 comprises a block diagram of a cross-coupled sum and difference engine as configured in accordance with an embodiment of the invention.

A digital processing platform 34 receives the digitized signals and de-couples the signals to then permit recovery of the original payload signals. In one embodiment, and referring now to FIG. 4, a cross-coupled sum and difference engine facilitates this process. In this embodiment, two signals (A and B in this illustration) are summed 41 with one another to provide a resultant sum A+B. Another summer 42 combines one of the signals (B in this illustration) with an inverted version 43 of the remaining signal (A in this illustration) to provide a resultant difference B−A. Such an engine can be readily utilized to effect coupling or, in the immediate example, decoupling of two signals. When the propagation environment is such that coupling between the signals is due solely to the antenna structure, the sum and difference engine will ordinarily be sufficient to decouple the two signals. Otherwise, additional decoupling may be appropriate. For example, the present decoupler or an additional matrix decoupler could be used to undo coupling caused by, for example, the propagation medium. Depending upon the nature of the coupling itself, as well understood in the art, additionally and possibly complex weighting of the input paths may further be appropriate as well to ensure accurate decoupling.

Figure 5:
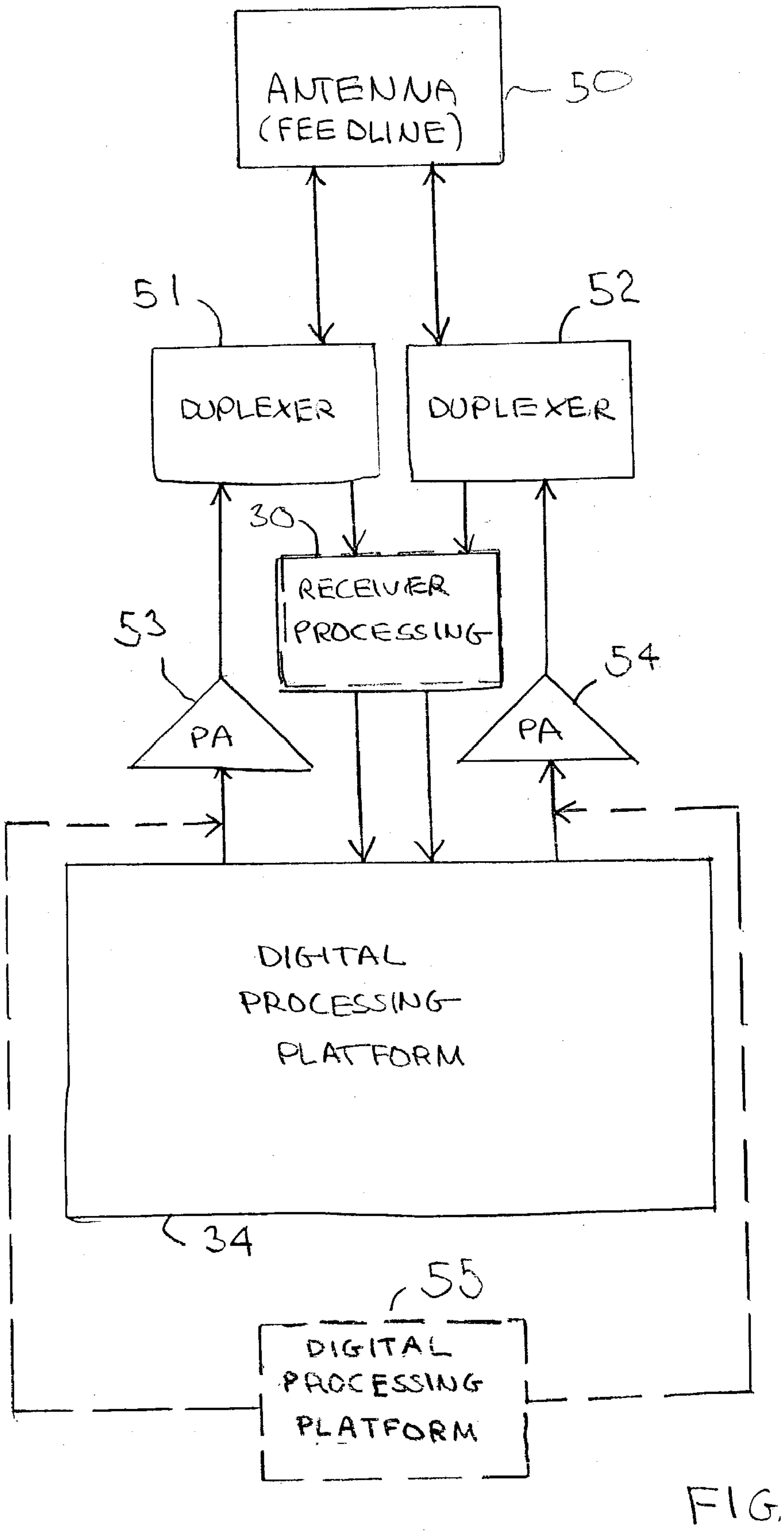
FIG. 5 comprises a block diagram of a transceiver as configured in accordance with various embodiments of the invention.

As noted above, these platforms and processes can be used to facilitate transmission of cross-coupled signals or to permit reception and de-coupling of such signals. These teachings are also amenable to combining such capabilities in a single transceiver platform. For example, with reference to FIG. 5, an antenna 50 as configured pursuant to these teachings can be coupled via each of its input/outputs to a corresponding duplexer 51 and 52 (such duplexers being well known and understood in the art). The received-signal output of each duplexer 51 and 52 can couple to a receiver processing stage 30 such as described earlier and then to a digital processing platform 34 as also described above. In addition, outputs from the digital processing platform 34 as also are described above can couple through one or more power amplifier stages 53 and 54 (as well understood in the art) to the transmission-signal inputs of the duplexers 51 and 52 and then to the input/outputs of the antenna structure 50. So configured, the antenna structure 50 can both receive and transmit cross-coupled signals and the digital processing platform 34 can both de-couple such received signals and source properly cross-coupled signals for transmission by the antenna structure 50.

As an alternative embodiment, a second digital processing platform 55 can be provided. So configured, the first digital processing platform 34 can serve to de-couple received signals and the second digital processing platform 55 can couple signals for transmission by the antenna structure 50.

It will be appreciated by those skilled in the art that these illustrative architectures represent only minimal additional component costs for a given wireless communications unit. Many such units already have a digital processing platform, and such an existing platform can likely be utilized as described herein as an additional supported activity. Furthermore, the other components, such as duplexers, power amplifiers, gain stages, down converters, and analog-to-digital converters are also all typically found in many modem two-way wireless communications devices. This being the case, the benefits of these teachings are attainable with little incremental cost.

Furthermore, pursuant to these teachings, many existing or proposed communications techniques that ordinarily require two or more antennas can be accommodated with a single traditional antenna structure and a corresponding feedline. Therefore, with little additional components being required, small form factors as well as cost restrictions can both often be accommodated. In effect, these teachings permit provision of a dual mode antenna wherein both modes can be utilized, during either reception or transmission, simultaneously.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method for use with an antenna, comprising:

within a digital processing platform:

providing a first payload signal that corresponds to energy received at a first part of the antenna;

providing a second payload signal that corresponds to energy received at a second part of the antenna, which second part is at least partially different from the first part of the antenna and wherein the second payload signal is at least partially cross-coupled with the first payload signal at least as a function of structure of the antenna;

substantially decoupling the first payload signal from the second payload signal.

2. The method of claim 1 wherein the antenna comprises a dipole portion and a feed line, and wherein the dipole portion comprises the first part of the antenna and the feed line comprises the second part of the antenna.

3. The method of claim 1 and further comprising:

down converting the energy received at the first part of the antenna with another signal to facilitate provision of the first payload signal;

down converting the energy received at the second part of the antenna with another signal to facilitate provision of the second payload signal.

4. The method of claim 3 wherein:

down converting the energy received at the first part of the antenna with another signal to provide the first payload signal and down converting the energy received at the second part of the antenna with another signal includes providing the another signal from a local oscillator.

5. The method of claim 1 and further comprising:

down converting the energy received at the first part of the antenna and the energy received at the second part of the antenna to at least a first and second intermediate signal, respectively;

converting the at least a first and second intermediate signal to a first and second digital representation, respectively;

providing the first and second digital representation to the digital processing platform.

6. The method of claim 5, and further comprising:

within the digital processing platform:

recovering the first payload signal from the first digital representation;

recovering the second payload signal from the second digital representation.

7. The method of claim 1 and further comprising:

passing at least a portion of the energy received at the first part of the antenna through a first duplexer;

passing at least a portion of the energy received at the second part of the antenna through a second duplexer.

8. The method of claim 7 and further comprising:

within the digital processing platform:

providing a first and second outbound payload signal;

cross-coupling the first and second outbound payload signal to thereby provide a first output signal that corresponds to a sum of the first and second payload signal to the first duplexer and a second output signal that corresponds to a difference between the first and second payload signal to the second duplexer.

9. The method of claim 8 wherein the digital processing platform includes a digital cross-coupled sum and difference engine and wherein cross-coupling is achieved through use of the digital cross-coupled sum and difference engine.

10. The method of claim 9 wherein the antenna comprises a part of a time division duplex communication system.

11. The method of claim 8 wherein the digital cross-coupled sum and difference engine is different that the second digital cross-coupled sum and difference engine.

12. The method of claim 11 wherein the antenna comprises a part of a frequency division duplex communication system.

13. The method of claim 7 and further comprising:

providing an outgoing payload signal;

coupling the outgoing payload signal to both the first duplexer and the second duplexer.

14. An apparatus comprising:

an antenna having at least two signal inputs/outputs;

a digital processing platform having an input operably coupled to the at least two signal inputs/outputs, wherein the digital processing platform has at least a first mode of operation comprising:

summing a first signal that corresponds to energy received at a first part of the antenna with a second signal that corresponds to energy received at a second part of the antenna, wherein the second part is at least partially different than the first part, to provide a summed signal;

determining a difference between the first signal and the second signal to provide a difference signal.

15. The apparatus of claim 14 wherein the antenna comprises a dipole portion and a feed line, wherein the dipole portion comprises the first part of the antenna and the feed line comprises the second part of the antenna.

16. The apparatus of claim 14 and further comprising:

down converting means for down converting the energy received at the first and second parts of the antenna to facilitate provision of the first and second signal.

17. The apparatus of claim 16 and further comprising at least one local oscillator that is operably coupled to the down converting means.

18. The apparatus of claim 16 wherein the down converting means is at least partially external to the digital processing platform.

19. The apparatus of claim 14 wherein the digital processing platform has at least a second mode of operation comprising:

using the summed signal and the difference signal to recover an original payload signal as transmitted to the apparatus.

20. The apparatus of claim 19 wherein the original payload signal includes at least two discrete payloads.

21. The apparatus of claim 14 and further comprising:

a first duplexer coupled between the input of the digital processing platform and an output of the antenna that outputs the energy received at the first part of the antenna; and a second duplexer coupled between the input of the digital processing platform and an output of the antenna that outputs the energy received at the first part of the antenna.

22. The apparatus of claim 14 wherein the digital processing platform comprises cross-coupled sum and difference means for receiving the first and second signal and for providing:

a first output that corresponds to a sum of the first and second signals; and a second output that corresponds to a difference between the first and second signals.

23. A wireless communication device comprising:

antenna means for at least one of receiving and transmitting a wireless signal;

digital cross-coupled sum and difference means operably coupled to the antenna means for at least one of:

summing a first signal that corresponds to energy received at a first part of the antenna means with a second signal that corresponds to energy received at a second part of the antenna means, wherein the second part is at least partially different than the first part, to provide a summed signal;

determining a difference between the first signal and the second signal to provide a difference signal; and summing a first outgoing payload signal with a second outgoing payload signal to provide a summed signal and providing the summed signal to be transmitted from a first part of the antenna means;

determining a difference between the first outgoing payload signal and the second outgoing payload signal to provide a difference signal to be transmitted from a second part of the antenna means, which second part is different from the first part.

* * * * *